April 9, 1963   W. J. DE BEAUBIEN   3,084,867
HEATING SYSTEMS WITH SHUT-OFF
Filed April 6, 1961   3 Sheets-Sheet 1

INVENTOR.
William J. DeBeaubien
BY
George E. Johnson
ATTORNEY

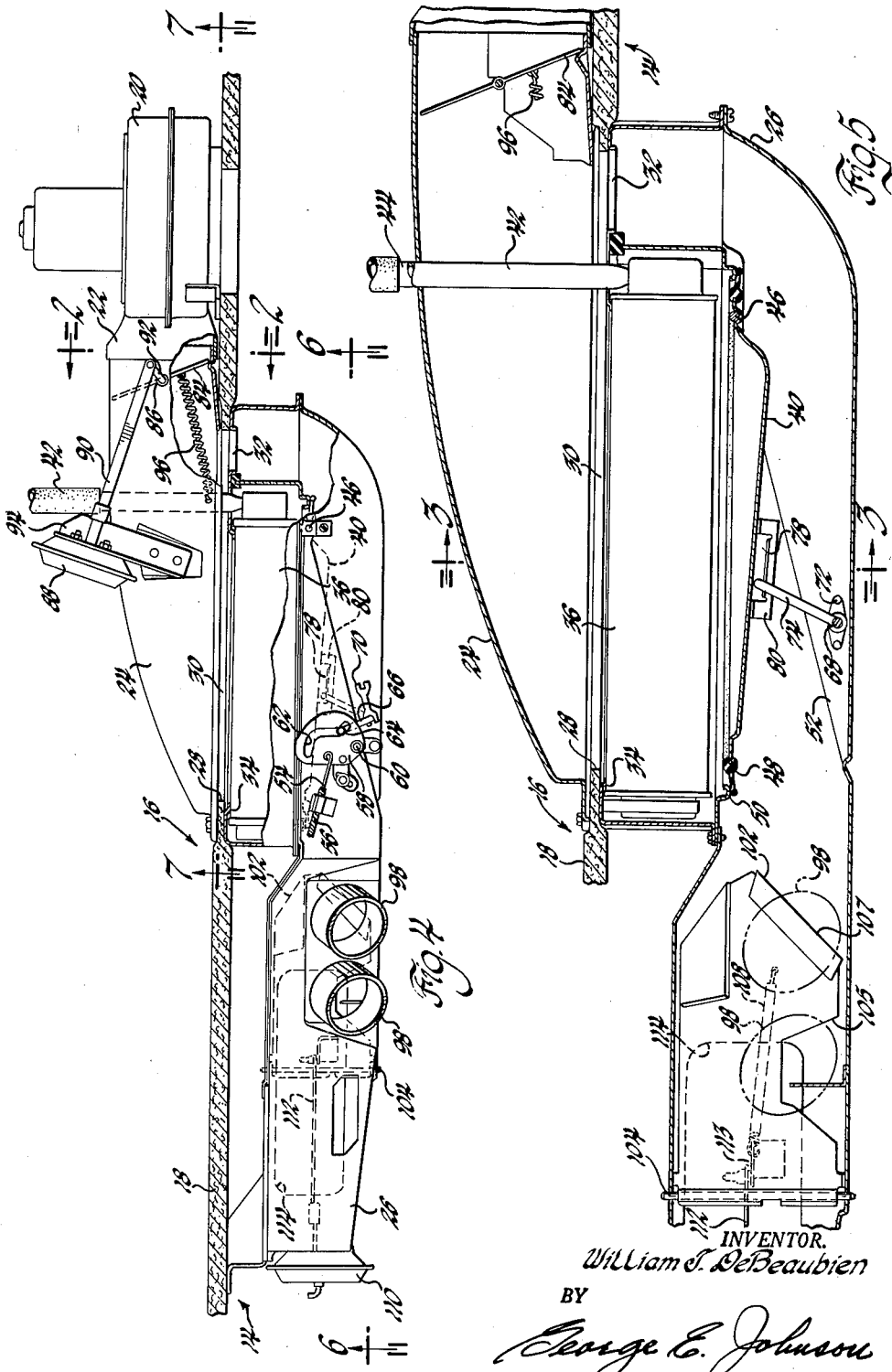

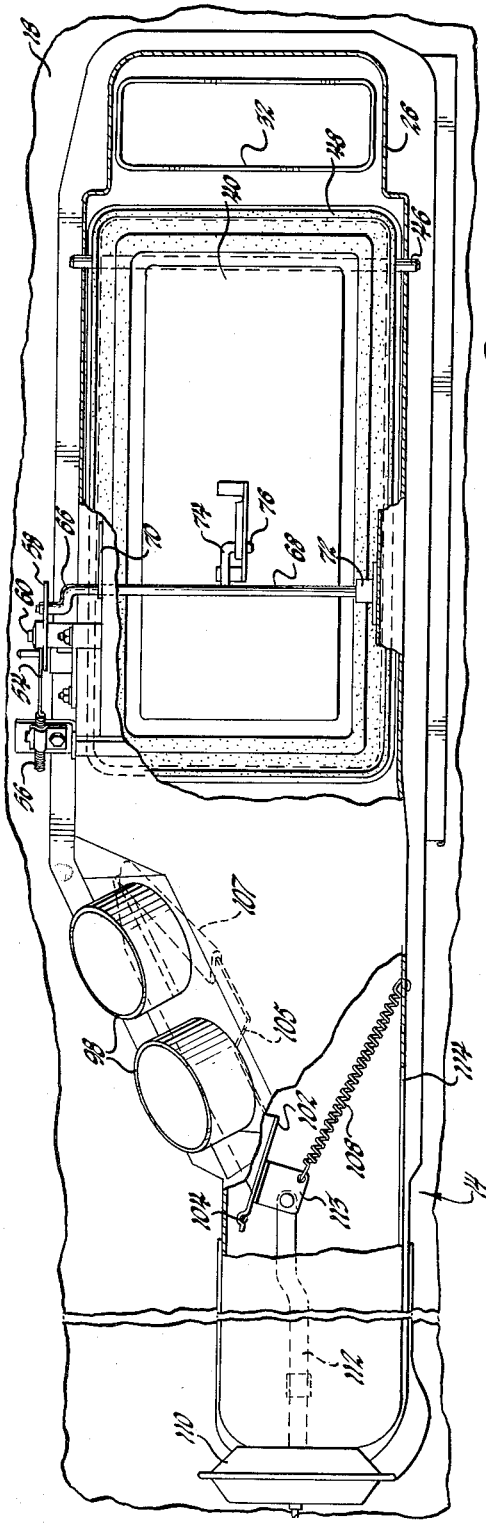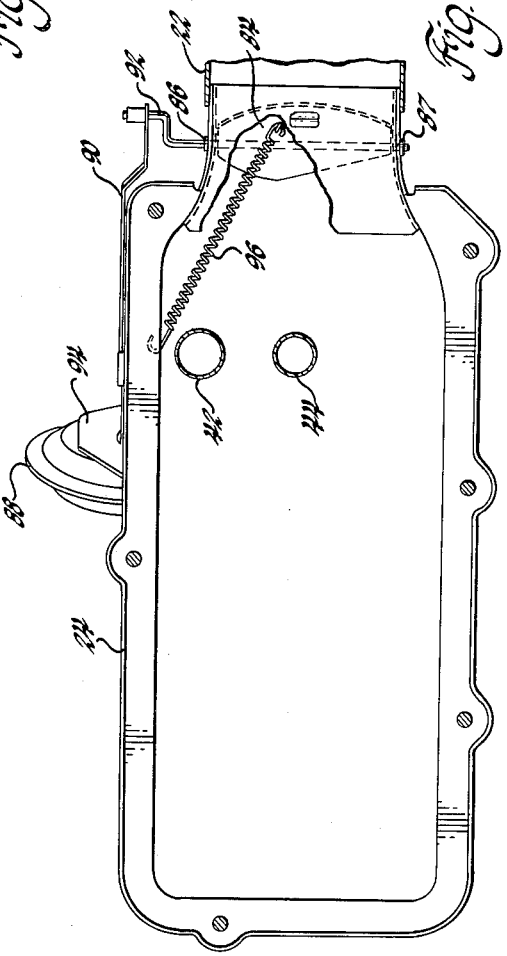
INVENTOR.
William J. DeBeaubien
BY
George E. Johnson
ATTORNEY /* Patent front page */

3,084,867
HEATING SYSTEMS WITH SHUT-OFF
William J. DeBeaubien, Birmingham, Mich., assignor to General Motors Corporation, Detroit, Mich., a corporation of Delaware
Filed Apr. 6, 1961, Ser. No. 101,239
1 Claim. (Cl. 237—12.3)

This invention relates to heating systems and more particularly to heating systems in which heat exchanger cores are used to transfer heat from engine coolant to air introduced into passenger compartments.

A conventional heating arrangement now much in use in the field of automotive vehicles is one in which outside air is admitted at the base of the windshield to a side chamber of the body for subsequent heating and discharge into the passenger compartment. The outside air admission forms no part of the present invention but is disclosed in the United States Patent to J. D. Leslie, R. M. Fox and E. J. Premo, No. 2,852,997, granted September 23, 1958. A problem exists in combining the abilities for effectively heating the air during cold weather and also shutting off substantially all the heat output of the heating system during hot weather using a heater core, dampers and ducts close up to the fire wall so that the spaces of the engine compartment or the passenger compartment will not be unduly encroached upon. The space occupied by the heating system components should be as small as possible without adversely affecting the heating system's operation when desired and with the retention of an effective heat shut-off when heat is not desired. It will be appreciated that merely a small amount of heat finding its way into the passenger compartment from the engine coolant during hot weather by either radiation or convection can be distinctly irritating. If no engine coolant valve is used to control liquid flow through the heater core as a means for regulating the heating of air and reliance for heat control is had upon air dampers only, then it is important that passenger compartment air during warm weather does not flow by any face or through any portion of the heater core.

An object of the present invention is to provide an improved automotive heating system compactly arranged and controllable in being capable of being shut off so that substantially no heat from the system will be introduced into the passenger compartment when it is not desired such as during hot weather.

A feature of the present invention is a heat exchanger core extending substantially parallel with and adjacent to an automobile fire wall in combination with a damper adapted to control air flow and which is interposed between the core and the air in or being introduced to the passenger compartment.

These and other important features of the invention will now be described in detail in the specification and then pointed out more particularly in the appended claim.

In the drawings:

FIGURE 4 is an enlarged plan view of heating system components in FIGURE 1, the vehicle fire wall being shown in section;

FIGURE 5 is a sectional view of a portion of the structure shown in FIGURE 4, a larger scale being used;

FIGURE 6 is a part sectional view of the structure in FIGURE 4 looking in the direction of the arrows 6—6 in that figure the parts being broken away better to illustrate the construction and the scale being the same as for FIGURE 5; and FIGURE 7 is a view of an air inlet manifold with a main damper therein and as seen looking in the direction of the arrows 7—7 in FIGURE 4.

Figure 1:
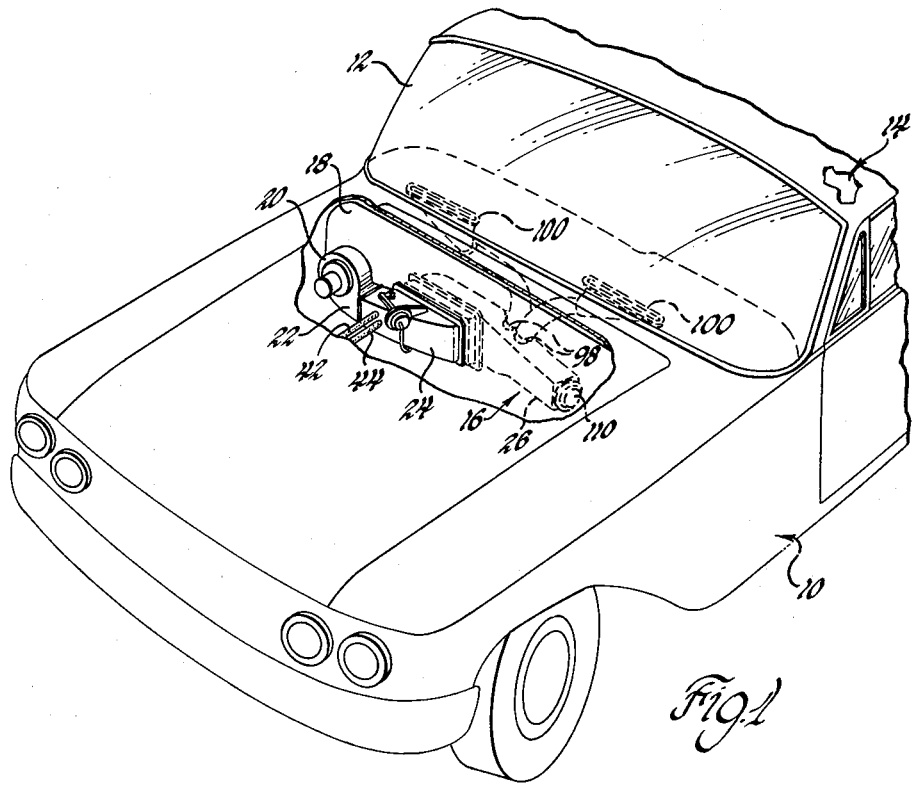
FIGURE 1 is a perspective view of the front portion of an automobile with a part of the sheet metal broken away to disclose heating system components in one embodiment of the present invention.
Figures 2, 3:
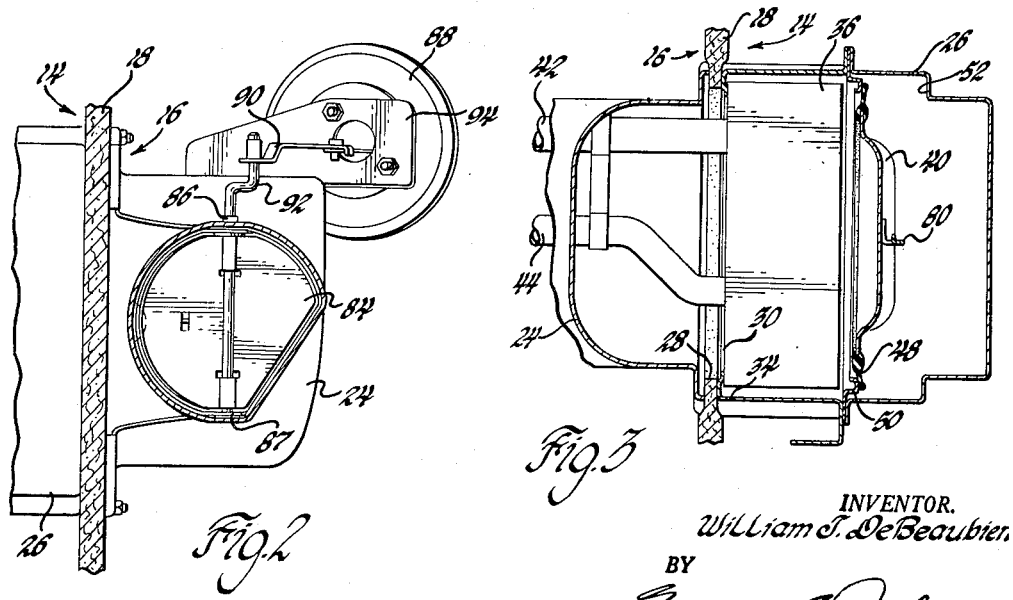
FIGURE 2 is a sectional view looking in the direction of the arrows 2—2 in FIGURE 4.
FIGURE 3 is a sectional view looking in the direction of the arrows 3—3 in FIGURE 5.

The automobile 10 shown in FIGURE 1 is provided with the customary windshield 12 partially defining the passenger compartment 14 and the engine compartment 16. The two compartments are separated by a conventional fire wall 18. A blower 20 is shown in FIGURES 1 and 4 as mounted on the fire wall 18 within the engine compartment 16 in such a position as to derive outside air from a chamber in the automobile body as disclosed in the patent hereinbefore mentioned. The discharge end 22 of the blower 20 is arranged to communicate with elongated duct work extending along the fire wall 18. This duct work includes an intake manifold 24 within the engine compartment 16 and a discharge manifold 26 located on the passenger compartment side of the fire wall. Communication between the intake and the discharge manifolds 24 and 26 is by way of a port 28 in the fire wall 18 and two passages 30 and 32 in registry with the port 28. The passage 30 is the larger of the two and is defined by sheet metal work 34 partially surrounding a conventional heater core 36. The passage 32 is smaller than the passage 30 but is also defined by the sheet metal work. It cooperates with the discharge manifold 26 and a damper 40 in defining a by-pass for the air around the heater core 36.

Engine coolant is adapted to be circulated through the core 36 by means of an engine coolant pump and by way of an inlet line 42 and a discharge line 44, the latter serving as a return line to the engine.

The damper 40 is pivotally mounted by means of a shaft 46 to the sheet metal work of the discharge manifold 26 and it bears a peripheral soft rubber strip 48 adapted yieldingly to engage a seat 50 formed on the sheet metal work. This damper is so arranged as to control the flow of air through the core 36. It is also so arranged that when in the open position, that is, with a full flow of air through the core obtained, that the rubber periphery 48 will be adapted to seat upon a ridge 52 (FIGURE 5) formed in the metal work of the discharge manifold. The operation of the damper 40 is effected by means of a Bowden wire 54 guided by a conduit 56 and having one end attached to a cam plate 58. The latter is mounted to pivot about a pivot pin 60 and is provided with a slot 62 in which is slidingly located one end 64 of a crank 66. This crank is adapted to rotate a vertical rod 68 of which it is a part. The rod is held by means of a snap element 70 and a step bearing 72 so that it is fixed with relation to the discharge manifold. An intermediate portion of the rod 68 bears an integral crank arm 74 with a downturned end 76 slidably retained within a slot 78 partially defined by a bracket 80 spot welded to the rear face of the damper 40.

A main damper 84 is pivotally mounted as at 86 and 87 to rotate within the intake manifold 24 and is arranged to be operated by means of a vacuum motor 88 cooperating with a link 90 connected to a crank arm 92. The motor 88 is supported on a bracket 94 fixed to the top side of the intake manifold 24. A spring 96 is placed in tension between the damper 84 and the intake manifold 24 urging the damper to a closed position. Application of a vacuum to the motor 88 tends to act against the loading of the spring 96 to open the valve.

The upper side of the discharge manifold 26 is provided with two tubular connections 98 for conducting air to the windshield defroster nozzles 100. A defroster damper 102 is pivotally mounted as at 104 to be closed or opened with respect to the connections 98 by means of a spring 108 urging the valve in one direction (closing) and a vacuum motor 110 acting through a link 112 to urge the valve in the other direction (to open position). The arrangement is such that the application of a vacuum to the motor 110 will serve by way of a bracket arm 113 to open the valve 102 about the axis of the pin 104 and thereby defrost the windshield 12. The defroster valve 102 is cut away at 105 and 107 (FIGURE 5) so that if the valve is fully closed some air may nevertheless be directed to the windshield 12.

The bottom wall of the discharge manifold 26 is provided with a substantially rectangular opening 114 which is so placed as to direct heated or unheated air downwardly into the passenger compartment 14 whenever the main valve 84 is open as will be understood.

The operation of the heating system is understandable from the above, but it may be stated that in the event no air is desired to be introduced by way of the duct work then the damper 84 is placed in its closed position as seen in FIGURES 4 and 5. If heating or ventilation air is required then the vacuum motor 88 is operated to open the main damper 84 and admit air to the intake manifold 24 preferably by action of the blower 20. If ventilation air only is required as on a hot summer day, the damper 40 is caused by the Bowden wire 54 and the cam plate arrangement to engage the seat 50. With this closing of the damper 40 and as shown in FIGURE 5, it is immaterial whether or not heated engine coolant is forced through the core 36 as air entering the intake manifold 24 will by-pass the core by way of the passage 32 and the passage between the rear wall of the discharge manifold 26 and the damper 40. The outside air will flow without being heated to the left as viewed in FIGURE 5 for discharge through the downwardly directed opening 114 and the defroster means into the passenger compartment 14.

In the event maximum heating is required, the damper 40 will be opened fully, that is moved against the seat 52. This will close off the by-pass passage 32 and render the core 36 fully effective to perform its heating function. When a lesser quantity of heat is required, the damper 40 will be adjusted accordingly and to an intermediate position so that unheated air will be admitted by way of the passage 32 and heated air will be permitted to flow from the core 36. The heated and unheated air will mix within the discharge manifold 26 for admission to the passenger compartment. It will be readily understood that the position of the damper 40 may be selected to regulate the heat content of the air admitted to the passenger compartment.

In this arrangement of the duct work, dampers and heating core 36, the system may be rendered fully effective in performing its heating function as required during cold weather and yet during hot weather the damper 40 may be so positioned that no heat from the engine coolant escapes to the air flowing into the passenger compartment. The contact of the air with the engine side face of the core 36 is of no moment as a dead pocket is presented in the intake manifold 24 when the damper 40 is closed against its seat 50. Air passing through the passage 32 is well separated from the core 36 as it continues on through the discharge manifold. The damper 40 is so effective in insulating the air flowing through the by-pass passage 32 from the heater core 36 that it has not been found necessary to place added insulation on the damper 40 although such an expedient could be used if necessary in a particular installation.

I claim:

A heating system in an automobile having an engine compartment and a passenger compartment, said system comprising a fire wall adapted to separate said compartments, an elongated duct work extending horizontally along said fire wall and including narrow inlet and outward ducts on opposite sides of the fire wall, a small opening and a large opening passing through said fire wall, said small opening being located upstream of said large opening, said inlet duct leading to said small and large openings, a flat liquid to air heat exchanger adjacent said fire wall traversing said large opening and enclosed by an intermediate portion of said duct work, the air discharge side of said heat exchanger lying in a plane extending across the width of said automobile, said duct work leading to said passenger compartment, means for supplying air to said inlet duct, a substantially flat damper positioned along the said air discharge side of said flat heat exchanger and dimensioned substantially to cover said side, a pivot mounting for said substantially flat damper located adjacent one margin of said air discharge side near said small opening, means for actuating said substantially flat damper, and the arrangement being such that pivotal movement of said substantially flat damper to one position effects air flow through said heat exchanger and substantially no air flow through said bypass passage and pivotal movement of said damper to another position effects air flow through said bypass passage and between one side of said damper and an inner wall surface of said duct work with no scrubbing action of said air discharge side and no air flow through said heat exchanger.

References Cited in the file of this patent

UNITED STATES PATENTS

| | | |
|---|---|---|
| 152,031 | Baker | June 16, 1874 |
| 2,413,770 | Knoy | Jan. 7, 1947 |
| 2,445,392 | Findley | July 20, 1948 |
| 2,518,356 | Mieras et al. | Aug. 8, 1950 |
| 2,612,829 | Joyce | Oct. 7, 1952 |
| 2,738,718 | Reynolds | Mar. 20, 1956 |
| 2,876,998 | Csabi | Mar. 10, 1959 |
| 2,984,415 | Wilfert | May 16, 1961 |
| 2,996,255 | Boylan | Aug. 15, 1961 |